United States Patent [19]
Wuthrich

[11] 3,966,498
[45] June 29, 1976

[54] ENERGY CELL CONFIGURATION FOR A TIMEPIECE

[75] Inventor: Paul Wuthrich, Watertown, Conn.

[73] Assignee: Timex Corporation, Waterbury, Conn.

[22] Filed: Nov. 18, 1974

[21] Appl. No.: 524,433

[52] U.S. Cl. .............................. 136/166; 58/23 BA
[51] Int. Cl.² .......................................... H01M 2/00
[58] Field of Search ............ 136/166, 173; 58/23 BA

[56] References Cited
UNITED STATES PATENTS

| | | | |
|---|---|---|---|
| 2,116,091 | 5/1938 | Williams | 136/173 |
| 2,178,063 | 10/1939 | Brooks et al. | 136/173 |
| 3,285,784 | 11/1966 | Babusci et al. | 136/166 |

FOREIGN PATENTS OR APPLICATIONS

| | | | |
|---|---|---|---|
| 1,058,942 | 6/1959 | Germany | 58/23 BA |

*Primary Examiner*—John H. Mack
*Assistant Examiner*—H. A. Feeley

[57] ABSTRACT

An improved energy cell configuration for an electric watch with a circular movement assembly and a center wheel, the cell having a convex arcuate sidewall conforming to the movement curvature and another sidewall extending across the movement and arranged to avoid the center wheel of the timepiece. Preferably the latter wall has a concave portion conforming to the curvature of the center wheel.

4 Claims, 5 Drawing Figures

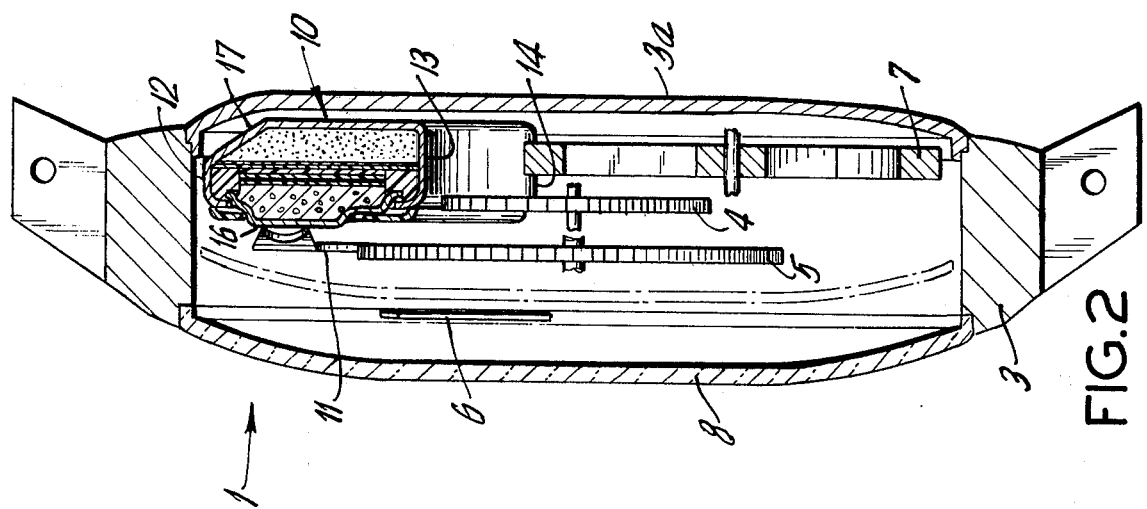
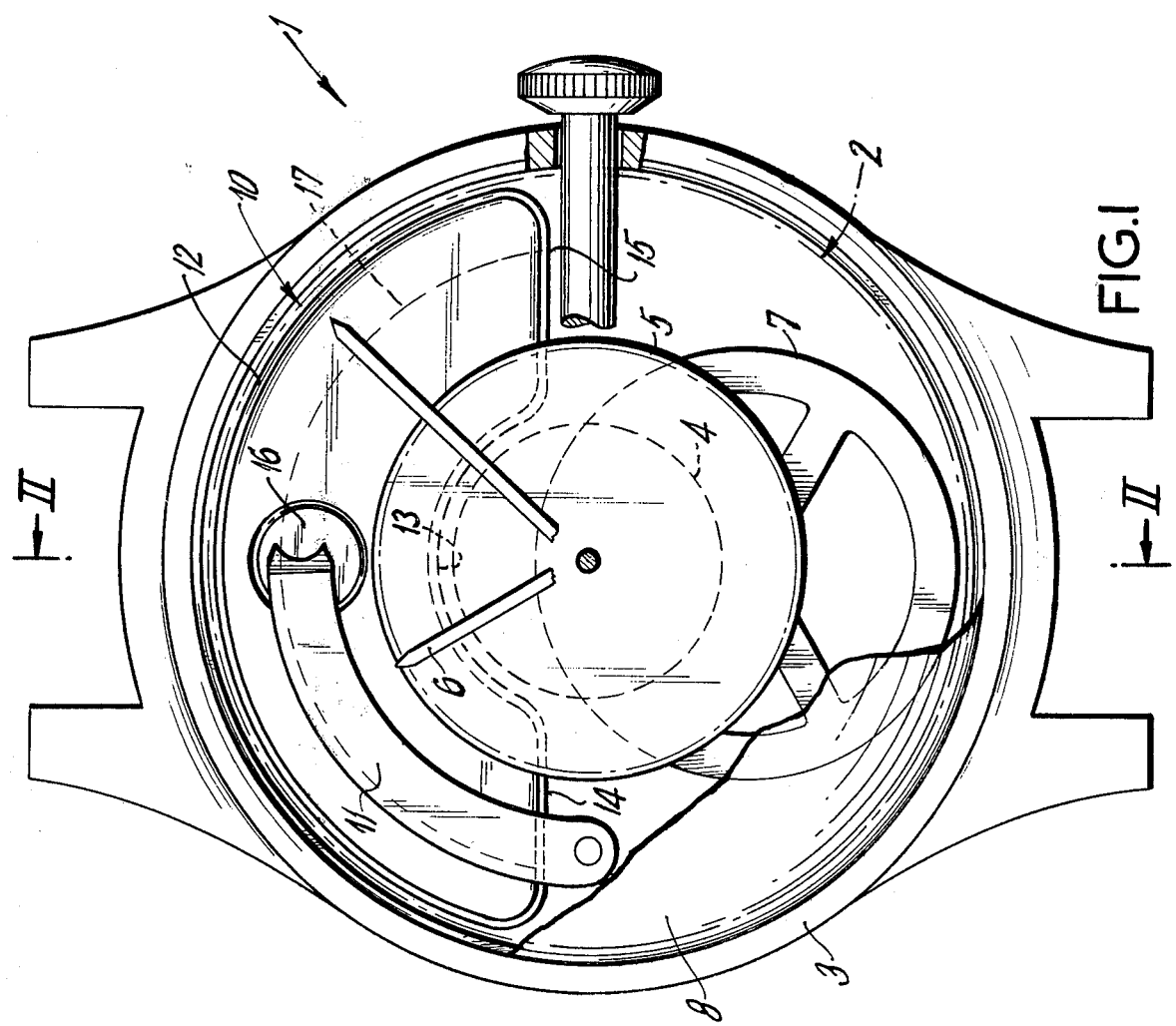

ENERGY CELL CONFIGURATION FOR A TIMEPIECE

BACKGROUND OF THE INVENTION

This invention relates to energy cells for horological devices, especially electric wristwatches. More particularly, the invention relates to an improved energy cell configuration which permits the largest possible cell volume and optimizes utilization of space in an electric watch.

Small primary energy cells used, for example, in watches and hearing aids are generally of a circular cross section and sometimes called "button" cells because of their shape and size. Such cells are generally alkaline cells and a typical cell uses a zinc amalgam anode, a mercuric oxide cathode, and an alkaline electrolyte such as potassium hydroxide.

An example of an improvement in such a cell is seen in U.S. Pat. No. 3,708,343 issued Jan. 2, 1973 to Walsh and assigned to the present assignee. That patent, which is incorporated herein by reference, employed an auxiliary insulating cap to provide an additional insulating seal over portions of the top anode cap.

It is known to construct a battery comprised of a plurality of cells, wherein individual cells have a particular non-circular shape in order to fit a container or wrapper. Such cells are suggested in British Pat. No. 23,238 (A.D. 1914) to Beaumont and French Pat. No. 787,005 to La Pile Leclanche Belge (1935). These shapes are dictated by requirements of nesting in a group of cells.

Small round or button cells have been used in electric watches for some time, but the circular shape does not permit the maximum utilization of space inside a watch. Particularly in a watch having a substantially circular movement assembly and a "center wheel" rotatably mounted in the watch, the conventional button configuration of energy cell is very wasteful of space and necessitates the diameter of the watch being greater than necessary because of the poor utilization of space by the energy cell.

Accordingly, one object of the present invention is to provide an improved configuration for an energy cell especially adapted for an electric watch.

SUMMARY OF THE INVENTION

Briefly stated, the invention comprises an improved configuration for a watch with a substantially circular movement and also having a rotatably mounted center wheel, the improvement comprising a cell with an arcuate convex sidewall with a curvature substantially corresponding to that of the watch movement and a second wall which is dimensioned to avoid the center wheel. The latter sidewall portion preferably has a concave arcuate portion with a radius slightly greater than that of the center wheel.

DRAWING

The above and many other objects and advantages of the invention will be better understood by reference to the following description taken in connection with the accompanying drawing, in which:

FIG. 1 is a plan view in schematic form of a watch with an energy cell having its preferred shape, FIG. 2 is a cross section of the watch and cell taken along lines II—II of FIG. 1, FIG. 3 is a modified energy cell shape, and FIGS. 4 and 5 are cross sections of a suitable cell taken along lines IV—IV and V—V of FIG. 3.

DESCRIPTION OF THE PREFERRED EMBODIMENT

Figure 3:
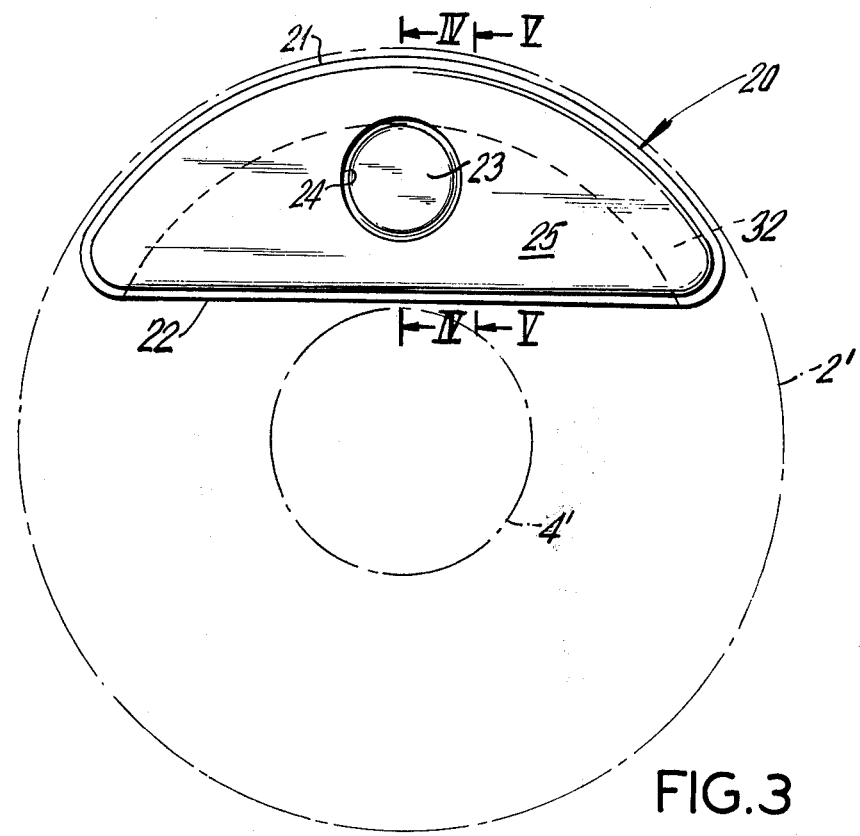

Referring to FIG. 1 of the drawing, only the vital parts necessary to an understanding of the present invention are shown for an electric watch 1 which has a substantially circular movement assembly indicated at 2 disposed within a case 3. The movement assembly 2, details of which are not shown, conventionally includes supporting members such as bridges which carry bearings for the various wheels of the gear train and the balance wheel. Since such details vary considerably and are not material to the present invention, only the vital elements of such an electric watch are shown herein which include a rotatably mounted center wheel 4, a coaxial rotatably mounted hour wheel 5 driving hands such as 6, and an oscillating balance wheel 7 which may include an electric coil disposed thereon to provide the driving impulses to keep the balance wheel oscillating. A typical electric watch movement is illustrated in the TIMEX watch service manual for Model 69, pages 69.1–69.12.

Reference to FIG. 2 of the drawing, also illustrates that case 3 includes a caseback 3a and a transparent crystal 8 enclosing the movement. The particular structural supporting members and extraneous gears and bearings are not shown, but are conventional and well known, as illustrated by the aforementioned service manual for Model 69 electric watch of the Timex Corporation.

The energy cell, which is the subject of the present invention, is shown generally at 10 and fits within the case and is connected to suitable internal circuits by a connector spring 11. In accordance with the present invention, the cell 10 includes a first arcuate convex sidewall 12 which has a radius of curvature corresponding roughly to that of the circular movement 2 or the interior wall of watchcase 3. Secondly, the cell has a second concave arcuate sidewall 13 which has a radius of curvature slightly greater than that of the center wheel 4. Wall portions 12, 13 are connected by substantially flat wall portions 14, 15. Wall portions 13, 14 and 15 together extend across the watch movement and avoid the center wheel 4. The cell includes a raised terminal button 16 making contact with the connector spring 11.

Reference to FIG. 2 of the drawing, further indicates that the cell cross section includes a beveled wall portion 17, enabling the cell to nest in the optimum fashion within the watchcase 3 and caseback 3a. FIG. 2 further illustrates how the shape of energy cell 10 optimizes the utilization of space within an electric watch to enable accomodation of the balance wheel 7 opposite the cell, the nesting of center wheel 4 within the concave wall portion 13 of the cell, and the overlapping of the larger wheels on top of the cell such as hour wheel 5.

Reference to FIG. 3 of the drawing illustrates a modified form of the invention. Here the circular movement outline for the watch is indicated at 2', and the center wheel at 4'. In this case, the energy cell designated at 20 assumes a simplier configuration with a first convex arcuate sidewall 21 conforming substantially to the movement curvature, and a flat connecting sidewall 22. Cell 20 is substantially D-shaped, and its greatest distance between sidewalls 21 and 22 (through the center of the D) is slightly less than the difference in radii between the movement 2 and the center wheel 4.

The cell has a projecting terminal button 23 which may be disposed in a cut-out 24 of an insulating upper covering 25, symmetrically disposed with respect to the sidewall portions.

Although the cells of the preferred embodiment of FIG. 1 and 2 and the cell of the modification of FIG. 3 may be constructed according to the various conventional techniques, one manner of construction is illustrated in connection with FIGS. 4 and 5 along the lines of the aforementioned U.S. Pat. No. 3,708,343. In both figures, the anode material is indicated at 26, the polarizing cathode material at 27 and suitable separator elements at 28. The bottom can 29 is swaged around a grommet 30 in the final stages of assembly after a top cap 31 has first been filled with the anode material and sealed and adhered to the grommet with adhesive. The top cap 31 has a raised terminal portion 23 (FIG. 4) and is flat over the remainder of the cell (FIG. 5). The auxiliary insulating cap 25 includes a cut out 24 for the terminal 23 (FIG. 4) and insulates the top cap over the remainder of the cell upper surface (FIG. 5). The bottom can 29 includes an arcuate beveled wall 32 connecting the bottom wall of the cell with sidewall 21 and selected to fit the contour of the case.

Figure 4:
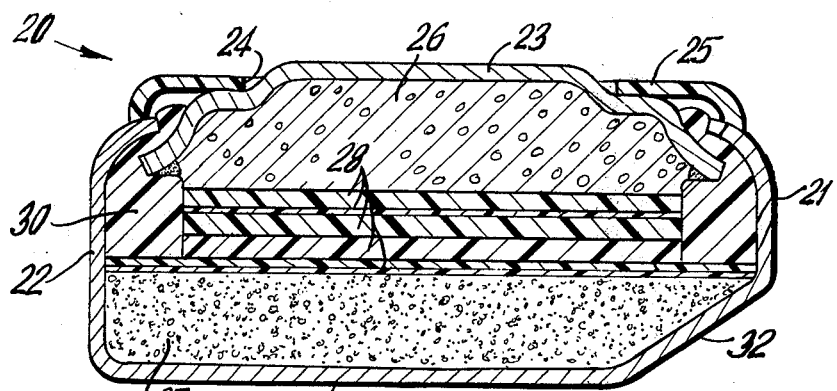
Figure 5:
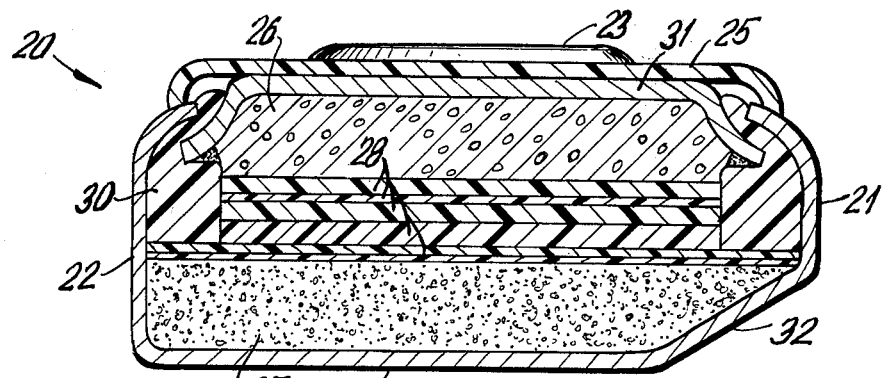

While the internal construction of the cell shown in FIGS. 4 and 5 is suitable, other types of alternative constructions using moldable plastic and the like may also be employed.

Thus there has been described an improved energy cell configuration for an electric watch which greatly increases the volume of active energy cell materials which can be contained within the same size watchcase. The improved cell therefore gives longer life and/or greater power capacity without increasing the size of the watch. While there has been described what is considered to be the preferred embodiment and one modification thereof, it is desired to secure in the appended claims all such modifications as fall within the true spirit and scope of the invention.

I claim:

1. An improved cell for a substantially circular electric watch movement having a rotatably mounted center wheel, wherein the improvement comprises:
    an outer container for said cell having a first arcuate convex sidewall portion with a first uniform radius of curvature and an arcuate beveled portion forming part of the bottom of the cell and connected along the edge of the first sidewall portion,
    a second connecting sidewall portion extending between the ends of the first sidewall portion, wherein said second wall portion includes an arcuate concave sidewall portion having a second smaller uniform radius of curvature.

2. The combination according to claim 1, wherein said second wall portion is flat and wherein the greatest dimension between the first and second wall portions is slightly less than the difference in radii between said watch movement and said center wheel.

3. The combination according to claim 1, wherein said cell container includes an arcuate beveled portion forming part of the bottom of the cell and connected to the first sidewall portion.

4. The combination according to claim 1, wherein said cell includes a raised, substantially circular, terminal portion on its upper surface symetrically disposed with respect to said sidewall portions.

* * * * *